Patented May 4, 1954

2,677,677

UNITED STATES PATENT OFFICE 2,677,677

POLYAMINOTRIAZOLES FROM DICARBOXYLIC ACIDS AND HYDRAZINE

James Wotherspoon Fisher and Edward William Wheatley, Spondon, near Derby, England, assignors to British Celanese Limited, a corporation of Great Britain No Drawing. Application May 17, 1951, Serial No. 226,954

Claims priority, application Great Britain June 7, 1950

5 Claims. (Cl. 260—78.4)

This invention relates to improvements in the production of polymer intermediates and to the production of polymers therefrom.

U. S. Patent No. 2,512,667 describes inter alia the production of nitrogen-containing polymers from dihydrazides of dicarboxylic acids in the presence of hydrazine, and U. S. Patent No. 2,512,600 the production of similar polymers from hydrazine and dicarboxylic acids. In both cases the total quantity of hydrazine is more than two moles for each mole of dicarboxylic acid present. Generally it is convenient to use hydrazine in the form of an aqueous solution, e. g. of some 60% strength. When, therefore, as in U. S. Patent No. 2,512,600, the free dicarboxylic acid is heated with aqueous hydrazine in a quantity so as to provide more than two moles of hydrazine, there is a considerable amount of water to be removed from the reaction mass owing to the use of the hydrazine in the form of an aqueous solution and a further quantity of water which results from the condensation itself. Generally these condensations are carried out at temperatures of the order of 200–300° C. Usually at these temperatures it is of advantage to carry out the initial condensation under pressure so as to retain all the water in the reaction zone, and then at a later stage to release the pressure wholly or in part.

We have now found that part of the water may be driven off at a much lower temperature to produce an intermediate product which appears to be polymeric in character and which can readily be converted to the poly-4-amino-1,2,4-triazole type of polymer described in U. S. Patents Nos. 2,512,-667 and 2,512,600. Specifically we find that if a polymethylene dicarboxylic acid from adipic acid upwards (i. e. a polymethylene dicarboxylic acid containing 6 or more carbon atoms) be heated at quite a moderate temperature, that is to say at a temperature not exceeding 170° C. and preferably not exceeding 160° C., with hydrazine, the reaction can be carried out in the open and the reactants may even be stirred by hand. The hydrazine is preferably added gradually to the melted dicarboxylic acid in the form of an aqueous solution, for example 60% aqueous hydrazine. The preferred temperature of reaction is not more than 20° and preferably not more than 10° above the melting point of the dicarboxylic acid. The melting points of the dicarboxylic acids with which the present invention is concerned range from about 109° for azelaic acid to about 150° for adipic acid, so that the preferred temperatures for reaction according to the present invention do not exceed about 155–160° for any of the acids.

In the production of these intermediates it is preferable to employ a proportion of hydrazine less than the total quantity ultimately necessary to make the polyaminotriazole. Thus we may use a quantity of hydrazine equal to between 1 and 2 moles of hydrazine for each mole of dicarboxylic acid. In the best form of carrying out the invention, the quantity of hydrazine used to make the intermediate is equal to about half of that necessary to make the final polymer, that is to say equal to 1 up to about 1.2 or 1.3 moles of hydrazine per mole of dicarboxylic acid. Thus this first half of the hydrazine is reacted with the dicarboxylic acid under very mild conditions and the resulting polymeric intermediate may be introduced into an autoclave with the remaining half of the hydrazine, preferably also in the form of an aqueous solution, and the further condensation carried out as described in the above specifications.

A typical preparation of the new intermediates comprises heating the dicarboxylic acid to a temperature just above its melting point in an open vessel and gradually adding aqueous hydrazine to a total of about 1–1.2 moles of hydrazine per mole of dicarboxylic acid. The temperature may, if desired, be allowed to fall somewhat while adding the hydrazine provided that resolidification does not occur. The temperature is maintained for several minutes or until the reaction mass becomes porridge-like. Heating is then continued to convert the material into a true solid, which is generally granular, which may then be dried in an oven. One of the new intermediates may be obtained, for example, by melting sebacic acid and running in 60% aqueous hydrazine in sufficient quantity to give the mono-hydrazine sebacate. Gentle heating is applied while stirring the reaction mass which, when all the hydrazine has been added, is in the form of a thick porridge-like mass. Heating is continued while allowing the water to evaporate until the mass begins to coagulate into wet mealy granules. At this stage the product is spread out on trays and dried for some hours in an oven, e. g. at 80° C. The product thus obtained from sebacic acid and hydrazine was insoluble in water, methanol and metacresol and had a melting point of 265–270° C. though it began to soften at 230° C. Its nitrogen content was 13.6%, which is well above the value for mono-hydrazine sebacate of 11.96%.

It will thus be seen that of the total quantity of water which must be driven off from the reaction mass in order to obtain the polyaminotriazole, about half has been driven off while reacting under these mild conditions and without pressure.

The new polymer intermediates generally have nitrogen contents between that corresponding with the structural unit of the polyhydrazide, namely [CO.(CH$_2$)$_x$—CO.NH.NH—] where $x$ is the number of methylene groups in the polymethylene dicarboxylic acid, and the nitrogen content of the salt formed from 1 mole of hydrazine and 1 mole of the dicarboxylic acid. Usually the nitrogen content is substantially closer to that of the polyhydrazide than to that of the salt and may, for example, correspond with a compound having the composition of the structural unit of the polyhydrazide as set out above but containing ¼–1 molecule of water and preferably .3–.8 molecule of water.

The following examples illustrate the invention but do not limit it in any way:

Example 1

192 parts of sebacic acid were melted in an open vessel at a temperature of 135–140° C. and about 55 parts of 60% aqueous hydrazine (i. e. approximately an equimolecular proportion) were gradually run in while stirring. After a few minutes the reaction mass became thick and porridge-like. Heating was continued at the same temperature while allowing the water to evaporate until the mass began to coagulate into wet mealy granules. The product was then spread out on trays and dried for some hours in an oven, e. g. at 80° C. The product was insoluble in water, methanol and metacresol, and had a melting point of 265–270° C. though it began to soften at 230° C. Its nitrogen content was 13.6% which is well above the value for monohydrazide sebacate of 11.93 but below the value for the corresponding polyhydrazide, namely 14.14%.

Example 2

98 parts of the polymer intermediate obtained according to Example 1 and having a melting point of 265–270° C. and 30 parts by weight of 57% aqueous hydrazine were mixed together in an autoclave and heated at 220° C. for 2 hours. The temperature was then raised to 260° C. and maintained for 1 hour. The pressure was then released over a period of ¾ hour to 550 lbs. per square inch and the polymer heated for a further 4 hours at that pressure and a temperature of 260° C. The product was insoluble in water and methanol and soluble in cresol, and had an intrinsic viscosity of 0.71 and was a good fibre-forming product.

Example 3

146 parts of adipic acid were melted at 150–155° C. in an open vessel and to the fused acid 55 parts of 60% aqueous hydrazine were added gradually with continuous stirring. After the addition of a little of the hydrazine the temperature was allowed to fall to 140° C., no resolidification occurring. When all the hydrazine had been introduced the reaction mass was in the form of a clear viscous solution which was maintained at 140° C. for several minutes. After about 5 minutes a haze developed in the liquid which gradually intensified until the contents of the vessel were a thick opaque porridge-like mass. Further heating converted the material into a granular solid. This was then transferred to an oven and dried for 2 hours at 100–110° C., ground into a powder and dried for a further period of 2 hours at the same temperature. The product was a pure white powder having a melting point of 325–330° C., insoluble in water, acetone and methanol and difficultly soluble in boiling formic acid. Its nitrogen content was 18.9%, which compares with a nitrogen content of the structural unit of the polyhydrazide of 19.7% and a nitrogen content of monohydrazine adipate of 15.7%. The product was convertible to a polyaminotriazole as described in Example 2 for the corresponding intermediate from sebacic acid.

Example 4

160 parts by weight of pimelic acid were melted in an open vessel at 110° C. and 55 parts of 60% aqueous hydrazine were gradually added with continuous stirring. The resulting clear viscous mixture was then heated at 120–130° C. for a few minutes until the whole mass resolidified. The product was then dried as described in Example 3. It was a white powder of melting point 278–280° C. having solubility properties similar to those of the product of Example 3 and a nitrogen content of 16.72%. This compares with a nitrogen content of the structural unit of the polyhydrazide of 17.95% and with a nitrogen content of the monohydrazine pimelate of 14.58%. Here again the polymer intermediate could be converted to the corresponding polyaminotriazole as described in Example 2.

Example 5

174 parts of suberic acid were melted in an open vessel at 150° C. and 55 parts of 60% aqueous hydrazine added gradually with stirring and while maintaining the temperature. After a short time the temperature was allowed to drop to 140° C. while avoiding resolidification. Heating was continued at 140° C. until the product solidified, and drying and pulverisation were carried out as in Example 3. The product was a white powdery solid, melting point 290–292° C., with solubility properties similar to those of the product of Example 3 and a nitrogen content of 15.29%. This compares with a nitrogen content for the structural unit of the polyhydrazide of 16.47% and a nitrogen content of monohydrazine suberate of 13.59%. Again this polymer intermediate was convertible into a polyaminotriazole as described for the corresponding intermediate from sebacic acid as in Example 2.

Similar intermediates may be made from other polymethylene dicarboxylic acids having more than 6 carbon atoms, for example azelaic acid, nonamethylene dicarboxylic acid, decamethylene dicarboxylic acid, brassylic acid and the like. In all the above examples only slightly more than 1 mole of hydrazine was used in the preliminary condensation to make the intermediate. However, higher quantities short of 2 moles of hydrazine may be used.

The invention includes the production of the intermediates themselves, the intermediates and the conversion of those intermediates to the final polyaminotriazoles. As in the specifications referred to, the final polymers may be spun into filaments.

Having described our invention, what we desire to secure by Letters Patent is:

1. Process for the production of polymer intermediates, which comprises melting a polymethylene dicarboxylic acid having at least 6 carbon atoms in the molecule under atmospheric pressure in an open vessel, running aqueous hydrazine into the molten dicarboxylic acid while stirring, the quantity of hydrazine added being between 1 and 2 moles for each mole of dicarboxylic acid, and heating while allowing free escape of water until the product solidifies.

2. A two-stage process for the production of polyaminotriazoles, which comprises melting a polymethylene dicarboxylic acid having at least 6 carbon atoms in the molecule under atmospheric pressure in an open vessel, running aqueous hydrazine into the molten dicarboxylic acid while stirring, the quantity of hydrazine added being between 1 and 2 moles for each mole of dicarboxylic acid, heating while allowing free escape of water until the product solidifies and thereafter heating the intermediate so formed under pressure with additional hydrazine sufficient to make up a total of more than 2 moles of hydrazine for each original mole of dicarboxylic acid, and continuing the heating until a polymer resistant to hydrolysis is produced.

3. Process for the production of polymer intermediates, which comprises melting a polymethylene dicarboxylic acid having 6–10 carbon atoms in the molecule under atmospheric pressure in an open vessel, running aqueous hydrazine into the molten dicarboxylic acid while stirring, the quantity of hydrazine added being about 1 mole per mole of dicarboxylic acid, and heating while allowing free escape of water until the product solidifies.

4. Process for the production of polymer intermediates, which comprises melting sebacic acid under atmospheric pressure in an open vessel, running aqueous hydrazine into the molten sebacic acid while stirring, the quantity of hydrazine added being about 1 mole per mole of sebacic acid, and heating while allowing free escape of water until the product solidifies.

5. A two-stage process for the production of polyaminotriazoles, which comprises melting sebacic acid under atmospheric pressure in an open vessel, running aqueous hydrazine into the molten sebacic acid while stirring, the quantity of hydrazine added being about 1 mole per mole of sebacic acid, and thereafter heating the intermediate so formed under pressure with additional hydrazine sufficient to make up a total of more than 2 moles of hydrazine for each original mole of sebacic acid and continuing the heating until a polymer resistant to hydrolysis is produced.

References Cited in the file of this patent

UNITED STATES PATENTS

| Number | Name | Date |
|---|---|---|
| 2,349,979 | Moldenhauer | May 30, 1944 |
| 2,512,601 | Bates et al. | June 27, 1950 |